July 23, 1968   H. G. MUHLBAUER   3,394,186
MANUFACTURE OF ANHYDROUS ETHYLENEDIAMINE
Filed Oct. 6, 1964
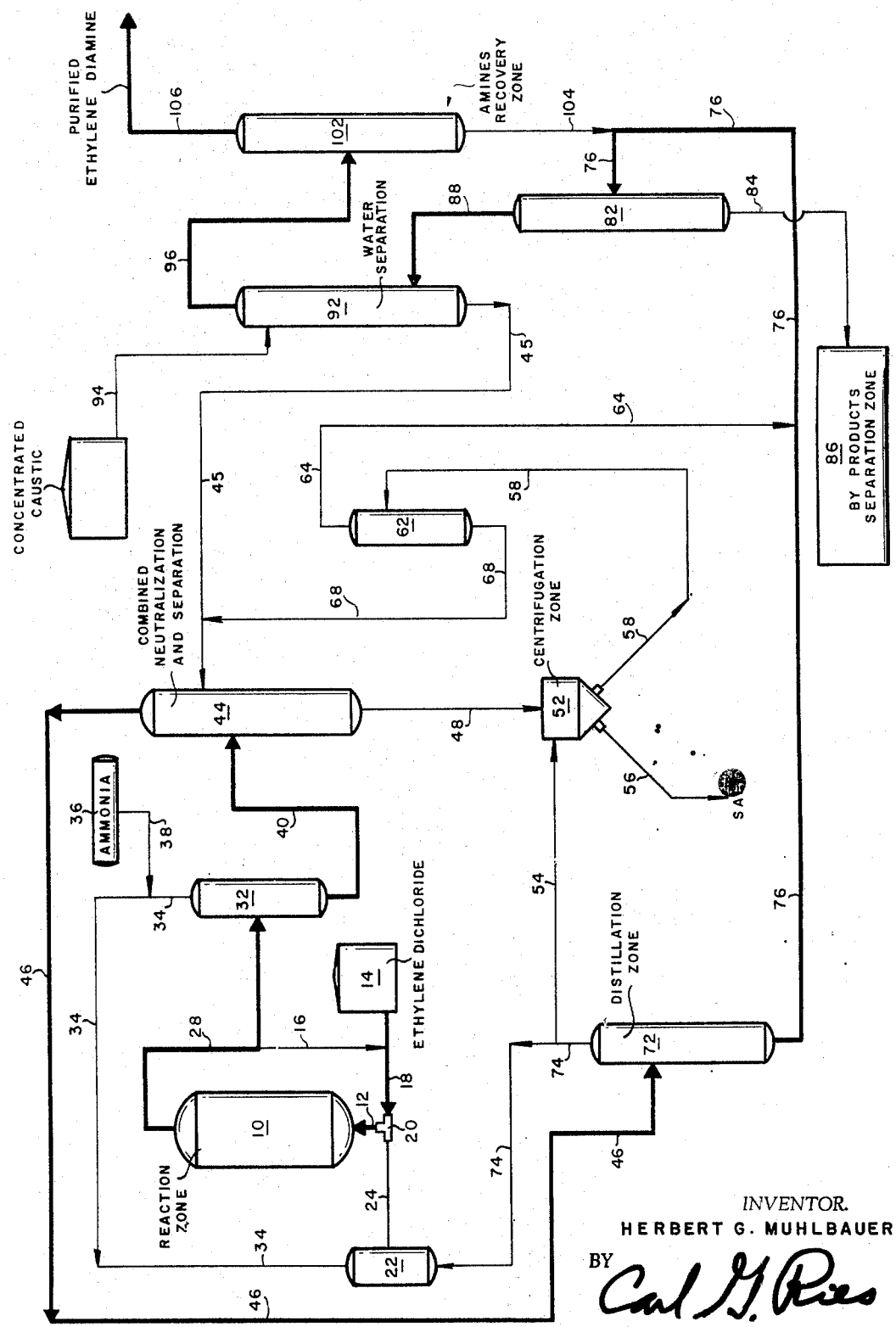
INVENTOR.
HERBERT G. MUHLBAUER,
BY
ATTORNEY.

United States Patent Office

3,394,186
Patented July 23, 1968

3,394,186
MANUFACTURE OF ANHYDROUS
ETHYLENEDIAMINE
Herbert G. Muhlbauer, Austin, Tex., assignor to Jefferson Chemical Company, Inc., Houston, Tex., a corporation of Delaware
Filed Oct. 6, 1964, Ser. No. 401,826
2 Claims. (Cl. 260—583)

ABSTRACT OF THE DISCLOSURE

Substantially anhydrous ethylenediamine is produced in a process which involves contacting ethylene dichloride with an excess of ammonia in aqueous solution which is then neutralized and distilled to remove a water-ethylenediamine azeotrope. This azeotrope is partially dehydrated through the addition of 60% to 80% aqueous caustic and is then distilled at atmospheric or subatmospheric pressure to produce the anhydrous distillate ethylenediamine product.

---

This invention relates to a method for the manufacture of an anhydrous amine. More particularly, this invention relates to an improved method for the continuous manufacture of anhydrous ethylenediamine from ethylene dichloride.

It has heretofore been proposed to react ethylene dichloride with an excess of ammonia to provide a reaction product comprising amine hydrochlorides, including ethylenediamine dihydrochloride, to neutralize the amine chlorides with a base such as sodium hydroxide to provide a product containing free amines, including ethylenediamine, and to recover ethylenediamine from the product. For many commercial applications, it is necessary that the ethylenediamine that is recovered be substantially anhydrous and contain only trace quantities of impurities. Accordingly, when it is desired to use an aqueous reaction system, removal of water from the final ethylenediamine product by distillation presents a serious problem, since ethylenediamine and water form a maximum boiling azeotrope containing only 81.6% ethylenediamine.

In accordance with the present invention, however, a process is provided for the production of anhydrous ethylenediamine from ethylene dichloride and aqueous ammonia.

Briefly, in accordance with the present invention, ethylene dichloride is reacted under aqueous conditions with excess ammonia to provide an aqueous ammoniacal reaction product comprising amine hydrochlorides. The crude reaction product is neutralized with an aqueous solution of caustic to provide an aqueous intermediate product comprising polyamines, including ethylenediamine. Next, in a distillation zone, the intermediate product is distilled so as to remove an aqueous ammonia fraction and an aqueous ethylenediamine fraction, the aqueous ethylenediamine fraction is topped to provide an aqueous ethylenediamine concentrate and, in accordance with the present invention, the concentrate is partially dewatered with concentrated caustic in a water extraction zone to provide an extract fraction from which anhydrous ethylenediamine can be recovered by simple distillation.

The invention will be further illustrated in conjunction with the accompanying drawing, which is a schematic flow sheet illustrating a specific example of the method of the present invention.

Turning now to the drawing, there is provided a reaction zone 10, which may suitably be a tubular reaction zone and which is provided with a suitable inlet line 12. Ethylene dichloride from a suitable source such as storage tank 14 and recycle from line 16, obtained in a manner to be described, are charged by way of a line 18 to a manifold 20 to which the inlet line 12 is connected. Simultaneously, an aqueous solution of ammonia from a suitable storage tank 22 is charged to the manifold 20 by way of a line 24. The aqueous solution of ammonia will suitably contain from about 30 to about 60 wt. percent of ammonia and will preferably be about a 50% aqueous solution of ammonia. The charge rates to the manifold 20 are preferably adjusted to provide an excess of ammonia with relationship to ethylene dichloride. Thus, for example, from about 10 to about 50 mols of ammonia per mol of ethylene dichloride may be employed and, more preferably, from about 20 to about 40 mols of ammonia per mol of ethylene dichloride will be provided.

Within the reaction zone 10 the ammonia is reacted with ethylene dichloride under suitable reaction conditions, including, for example, a temperature within the range of about 75° to about 175° C. and a pressure within the range of about 200 to about 2,000 p.s.i.g. More preferably, the reaction conditions include a temperature within the range of about 80° to about 140° C. and a pressure within the range of about 500 to about 1,000 p.s.i.g. The reactor holding time may suitably be within the range of about 5 to about 60 minutes and will more preferably be within the range of about 10 to about 20 minutes. As a consequence, the ethylene dichloride reacts with ammonia to provide ethylenediamine dihydrochloride and amine hydrochloride by-products.

The crude reaction mixture is discharged from reaction zone 10 by way of a line 28 leading to a separation zone 32. It is frequently desirable to recycle from about 5 to about 50 wt. percent of the crude reaction product, and this may be conveniently accomplished through the provision of branch line 16, described above, interconnecting discharge line 28 with a charge from line 18 to manifold 20.

Within the separation zone 32, a major portion of the ammonia and some of the water are vaporized for removal overhead by way of a line 34 leading to the aqueous ammonia storage drum 22. If desired, fresh ammonia for the process may be conveniently added at a replacement rate to the line 34, for example, from a storage tank 36 from a line 38 leading to the line 34.

The liquid component is discharged from separation zone 32 by way of a line 40 leading to a combination neutralization and separation zone designated generally by the number 44. A dilute caustic solution, obtained in the manner to be described, is also charged in the zone 44 by way of a line 45. Suitably, the dilute caustic solution charged by the line 45 will contain from about 30 to about 60 wt. percent of sodium hydroxide, the balance being substantially all water. Within the zone 44, an exothermic neutralization reaction will occur between the sodium hydroxide and the amine chlorides, resulting in the formation of free amines and sodium chloride. By maintaining the zone 44 at a temperature of about 120° C. or more, such as a temperature of about 120° or 130° C. to about 180° C., the water and free amines will be volatilized overhead as formed and can be removed by way of a line 46 for further processing. The remaining liquid component will be a slurry of sodium chloride in aqueous caustic which may be discharged from the zone 44 by way of a line 48 leading to a suitable separation zone comprising, for example, a centrifuge 52. Within the centrifuge 52, the slurry is resolved into a solid filtered salt fraction and a filtrate fraction. The filtered salt fraction is preferably washed with wash water charged to the centrifuge 52 by way of a line 54, the wash water being combined with the filtrate. The washed salt is discharged from centrifuge 52 by way of a conduit 56, and the filtrate and wash water are discharged by way of a line 58 leading to a separation zone 62 wherein any entrained amines removed from the zone 44 separate by phase separation for discharge from the zone 62 by way of a line 64. The aqueous solution of caustic is discharged from the zone 62 by way of a line 68 for recycle to the charge line 45 for zone 44.

The aqueous amines fraction discharged from zone 44 by way of a line 46 is charged to a suitable distillation zone, such as an atmospheric pressure distillation column 72, wherein the product is separated into an overheads fraction containing all of the ammonia, a significant amount of water and only trace quantities of ethylenediamine. The overhead fraction 74, after liquefaction, may be recycled to the aqueous ammonia storage tank 22. A portion of the stream 74 may be removed therefrom by way of a line 54 as a source of wash water for centrifuge 52.

The bottoms fraction 76 from the zone 72 will contain less than about 30 wt. percent of water, the balance being amines, and is discharged by way of a line 76 to an amines recovery zone which may suitably comprise distillation columns 82 and 102 and water extraction tank 92. Thus, the bottoms fraction 76 may be charged to topping column 82 which is operated under simple atmospheric predistillation conditions to provide an overhead fraction 88 comprising a water-ethylenediamine azeotrope. The bottoms from the column 82, which will comprise by-product amines, is discharged by way of a line 84 leading to a conventional by-products separation zone 86 (shown schematically) for the recovery, separation and disposal of by-products.

The distillate fraction from the column 82 which is substantially free from by-products but which still contains a significant amount of water (e.g., 20–30 wt. percent is discharged by way of a line 88 to a water extraction zone 92 maintained at a temperature of about 70° to 100° C., where it is countercurrently contacted with a concentrated aqueous solution of caustic charged to the tower 92 by way of a line 94 charged at the rate of about 50 to 150 parts by weight (e.g., 80 to 120 parts) per 100 parts by weight of distillate fraction 88. The concentrated solution of caustic will desirably contain from about 60 to about 80 wt. percent of caustic (e.g., about 70 wt. percent). As a consequence of the countercurrent extraction step, an ethylenediamine extract fraction is formed which is discharged by way of a line 96, and a caustic raffinate fraction is formed which is discharged by the line 45.

For example, when 100 parts by weight of a distillate 88 comprising about a 77 wt. perecnt aqueous solution of ethylenediamine is brought into contact with about 90 parts of a 73 wt. percent aqueous solution of caustic, there is obtained about 85 parts of an extract fraction 96 containing about 92% ethylenediamine and about 105 parts of a raffinate fraction 45 comprising about a 62 wt. percent solution of caustic. The fraction 96 is charged to a suitable distillation column 102 which may be an atmospheric pressure column or a vacuum column, where-in the extract fraction is separated into an overhead ethylenediamine fraction 106 which contains only trace quantities of water and other amine impurities and a bottoms fraction containing water and ethylenediamine which is discharged by way of a line 104 for recycle back to distillation column 82.

The column 102 is preferably a vacuum distillation column. The purification can be accomplished with an atmospheric column of high fractionation capacity with high reflux, whereas with conventional vacuum distillation columns less distillation capacity and less reflux are required which, in turn, allows a higher recovery per pass and lower operating costs. That is to say, it has been observed that there is a significantly steeper slope for a plot of distillate ethylenediamine concentration with respect to the percent of charge recovered as overhead with subatmospheric distillation as opposed to atmospheric distillation.

What is claimed is:

1. A method for the production of substantially anhydrous ethylenediamine comprising the steps of (A) contacting ethylene dichloride with a molar excess of ammonia in aqueous solution at a temperature within the range of about 75° to about 175° C. to provide a crude reaction mixture containing ethylenediamine dihydrochloride, (B) contacting said crude reaction solution with about 50 to about 75 wt. percent aqueous solution of caustic in a combination neutralization distillation zone at a temperature of about 80° to about 100° C. to neutralize said ethylenediamine dihydrochloride and flash a water and amine azeotrope overhead, (C) contacting said azeotrope in liquid solution with from about 0.5 to about 1.5 parts per part of azetrope of a 60 to 80 wt. percent aqueous solution of caustic to selectively, partially remove water from said azeotrope and (D) fractionating said partially dewatered azeotrope at a subatmospheric pressure of about 100 to 500 mm. of mercury absolute to obtain an anhydrous distillate ethylenediamine product.

2. A method as in claim 1 wherein said azeotrope is contacted with a solution containing from about 65 to about 75 wt. percent of caustic and wherein said thus partially dewatered azeotrope is distilled at a temperature of 75° to 90° C. at a pressure of about 150 to about 300 mm. of mercury absolute.

References Cited

UNITED STATES PATENTS

| 2,028,041 | 1/1936 | Bersworth | 260—583 |
| 2,922,818 | 1/1960 | Spielberger et al. | 260—583 |
| 2,769,841 | 11/1956 | Dylewski et al. | 260—583 XR |

FOREIGN PATENTS

| 831,025 | 3/1960 | Great Britain. |

FLOYD D. HIGEL, *Primary Examiner.*